M. B. VAN NESS.
WELL STRAINER.
APPLICATION FILED JUNE 17, 1918.
1,291,288.
Patented Jan. 14, 1919.
2 SHEETS—SHEET 2.
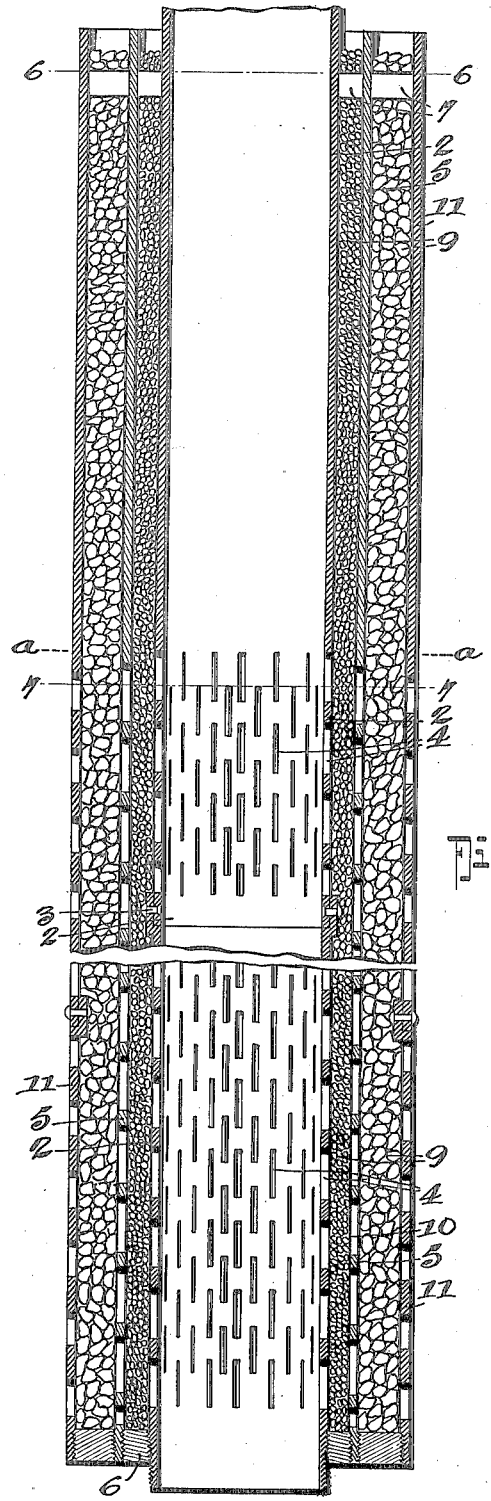
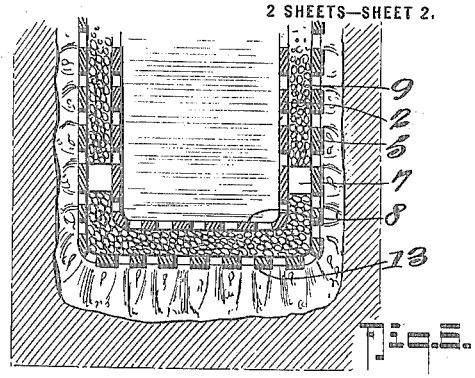
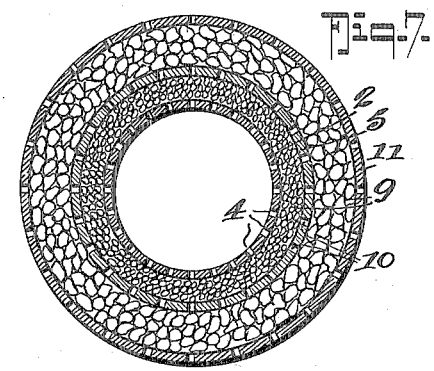
INVENTOR
Marvin B. Van Ness.
BY
Fred J. Dieterich & Co
ATTORNEYS

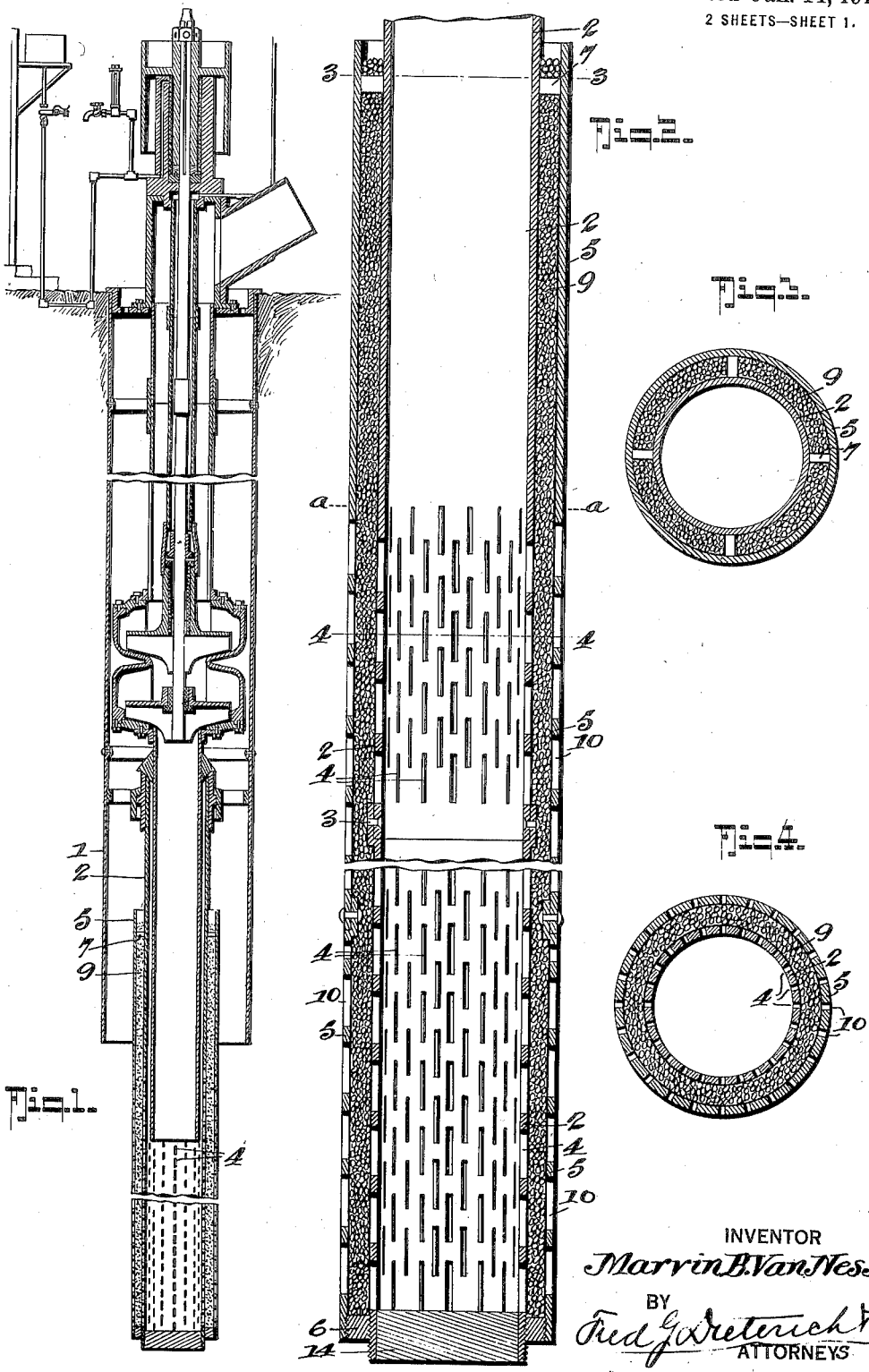

UNITED STATES PATENT OFFICE.

MARVIN B. VAN NESS, OF WELSH, LOUISIANA.

WELL-STRAINER.

1,291,288.

Specification of Letters Patent.   Patented Jan. 14, 1919.

Application filed June 17, 1918.   Serial No. 240,359.

*To all whom it may concern:*

Be it known that I, MARVIN B. VAN NESS, a citizen of the United States, at present residing in Welsh, in the parish of Jefferson Davis and State of Louisiana, have invented a new and Improved Well-Strainer, of which the following is a specification.

My invention is an improved strainer especially adapted for use in deep wells and it particularly has for its object to provide a strainer which will be inexpensive, one which can readily be put into place and one in which provision is made for the settling of the filtering material.
The invention also has for its object to provide a strainer which can be assembled and packed before setting in the well and one whose construction is such that water may be forced down on the inside and outwardly through the strainer, thereby washing the mud out of the hole, after the strainer has been installed.

My invention furthermore provides for a strainer of any length desired, since by using a number of pipe sections, the length of the filter may be adapted to the particular well in which it is to be used.

Again, the invention has for its object to provide an open bottom strainer, whereby the same may be set in wells at great depth by utilizing the jetting process and after being set, the opening at the bottom can be plugged up.

The invention includes those novel details of construction, combination and arrangement of parts, all of which will be first fully described and then specifically pointed out in the appended claims, reference being had to the accompanying drawings in which:
Figure 1 is a vertical longitudinal section, parts being broken away illustrating the invention in use in a deep irrigation well.

Fig. 2 is an enlarged detail vertical section, parts being broken away, of the strainer *per se*.

Figs. 3 and 4 are respectively sections on the lines 3—3 and 4—4 of Fig. 2.

Fig. 5 is a view similar to Fig. 2 of a modification of the invention showing the open bottom strainer before the bottom hole has been plugged up.

Figs. 6 and 7 are respectively cross sections on the lines 6—6 and 7—7 of Fig. 5.

Fig. 8 is a detail vertical sectional view of the lower end of a modified form of the strainer showing how water may be pumped down through the strainer and outwardly to wash mud out of the well hole and to clean the filtering material.

In the drawings in which like numerals of reference indicate like parts in all figures, 1 is the pit casing and 2 the well casing which, at its lower end, constitutes a part of the strainer which forms the subject matter of my present application.

The strainer consists of the inner pipe 2 built up of sections, if desired, coupled together as at 3.

The pipe 2 is slotted or perforated as at 4 to permit passage of the water and around the pipe 2 and spaced a suitable distance from the same is another pipe 5 which is also provided with perforations 10, the pipes 2 and 5 being spaced apart to form a chamber to contain the filtering material which may be gravel or other suitable material, such for example as adamantine, the latter being preferred where high pressures are encountered, as in gas wells, etc.

The strainer may consist only of the two pipe sections 2 and 5 with the filtering material 9 located between the pipes (see Fig. 2) or additional pipes 11 may be provided and additional filtering material 9, as indicated in Fig. 5, the several pipes being suitably perforated and spaced from one another as best indicated in Figs. 3, 4, 6 and 7 of the drawings.

The pipes 2 and 5 are spaced apart at the bottom by a closure plug 6, suitably secured to the two pipes in relatively fixed relation and spacers 7 may be located between the pipes near the upper end or at intervals, if desired, to maintain the pipes in concentric relation.

The pipes 2 and 5 (and the additional pipes surrounding the same, when such are employed) are perforated only a certain distance from their lower end, say to the line *a—a* in Figs. 2 and 5 and above this line, for a desired distance, the pipes are imperforated so as to provide a reservoir or hopper for the filtering material, the object of which is to provide a reserve supply of filtering material that will settle down and take the place of the filtering material within the perforated zone of the pipes as such material becomes worn by the abrasive action of the water or as such material settles down into more compact formation, thus insuring long life to the filter before making it necessary to pull the filter from the well and repacking the same.

In putting the filter into the well, the filtering material is packed into spaces provided for it and the bottom of the pipe 2 may be plugged up, if desired, or it may be left open and water pumped down through the pipe 2 through the open bottom to wash out the well during the lowering of the filter into the same, or if preferred, a structure such as shown in Fig. 8 may be employed, in which the bottom of the pipe 2 is closed by a perforated wall 8 and the bottom of the outer pipe 5 is also provided with a perforated wall 13 between which the filtering material is located and water can be pumped down through the pipe 2 to force it out through the perforations and filtering material to wash the mud out of the well.

When the strainer is lowered into the well, without the pipe 2 being plugged up, after it has been put into place in the well, a plug 14 can be driven down to the bottom of the pipe 2, past the perforations to close the opening at the bottom of the pipe 2 and thus make it necessary for the well water to enter the pipe 2 only through the perforations.

As many pipes 5 and 11 may be used as found desirable, in practice, and the filtering material in the several compartments may be graduated as to coarseness, see Fig. 5, if found desirable.

By providing a structure as shown and described, the strainer is adapted for use in almost any kind of well and is particularly adapted for high pressure well service, as it is so constructed that it can be assembled before lowering the same into a well that has already been dug, or it can be let down into the well by the jet process, since its structure is such that water can be forced down through the pipe 2 to wash out the mud and sediment in advance of the strainer, as it is being lowered into the well.

From the foregoing description taken in connection with the drawings, it is thought that the complete construction, the manner of operation and the advantages of the invention will be clear to those skilled in the art to which it appertains.

What I claim is:

1. A strainer comprising a plurality of perforated pipes disposed one within another and a filtering substance packed between the outer and inner pipes, said pipes having imperforated portions to contain a reserve supply of filtering substance.

2. A well strainer comprising a plurality of perforated pipes disposed one within another and filtering substance packed in the space between the pipes within the zone of the perforations, the outer pipe being extended above the perforated zone to form a reservoir for a reserve supply of filtering substance, said filtering substance adapted to gravitate down into the perforated zone of the pipes upon settling of the filtering substance at the perforated zone of the pipes.

3. A well strainer comprising an inner pipe, said pipe being perforated throughout a predetermined portion of its length, an outer pipe surrounding the inner pipe and perforated throughout a corresponding portion of its length, means closing the space between said pipes at the bottom, a filtering substance packed in the space between the pipes throughout the perforated portion of their lengths and a sufficient distance above the same, whereby to provide a reserve supply of filtering substance that may settle down to replace worn or displaced material within the perforated zone of said pipes, the inner pipe being open ended and means for closing the lower end of the inner pipe while the same is in the operative location in the well.

MARVIN B. VAN NESS.